Dec. 26, 1950     E. J. MEAD     2,535,366

ANTITHEFT SWITCH APPARATUS

Filed May 29, 1946

INVENTOR
Elmer J. Mead
BY
Brown, Critchlow, Flick & Peckham
his ATTORNEYS

Patented Dec. 26, 1950

2,535,366

UNITED STATES PATENT OFFICE 2,535,366

ANTITHEFT SWITCH APPARATUS

Elmer J. Mead, Pittsburgh, Pa.

Application May 29, 1946, Serial No. 673,196

1 Claim. (Cl. 200—98)

This invention relates to anti-theft apparatus for motor vehicles, and more particularly to apparatus for opening the circuit between the storage battery and ignition system of a vehicle.

It is among the objects of this invention to provide electrical apparatus which automatically switches the storage battery of a motor vehicle out of the ignition circuit when the ignition switch is turned off, which prevents a jumper from being used around the ignition switch, which is composed of standard parts, which is easy to install, which requires but little room, and which requires only an inappreciable amount of current from the battery to operate it.

According to this invention a main switch is placed in the storage battery circuit of a vehicle. When this switch is open, as it is when the ignition is turned off, the battery is isolated from the ignition circuit of the vehicle, except possibly for a wire to parking lights. The switch is closed by energizing an electromagnet, and it is permitted to open by means of another electromagnet. The first magnet is energized when the ignition switch on the dashboard is turned on, and the second magnet is energized when that switch is turned off. To keep either magnet from consuming current for more than a moment after a circuit has been completed through it, the closing of the main switch immediately opens the circuit through the magnet that closed it, and opening of the main switch causes the circuit through the other magnet to open. As one circuit is broken the other one is put in condition to be completed when the ignition switch is turned from its present position to its other position. Preferably, this is brought about by an automatic switch that is actuated as a result of the opening and closing of the main switch. This anti-theft apparatus, including the electrical connections to the ignition switch, is enclosed in a locked box and tamperproof conduit.

Figure 1:
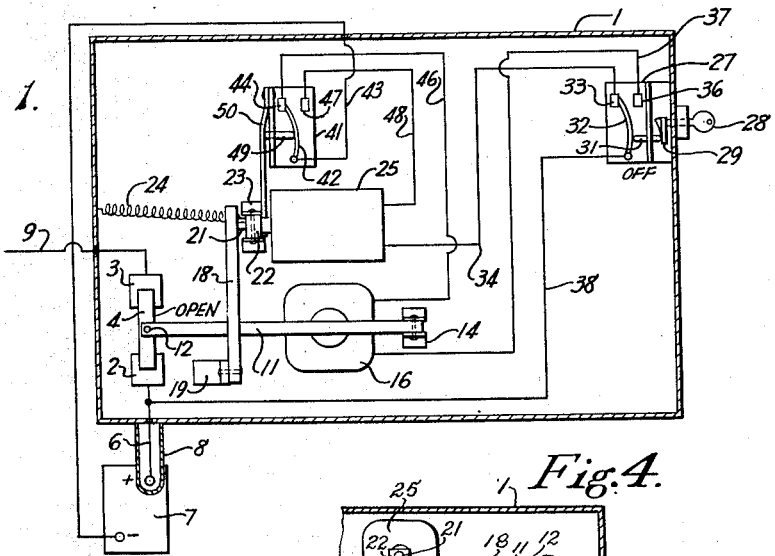
Figure 4:
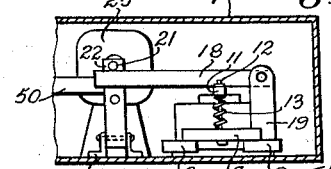
Figure 2:
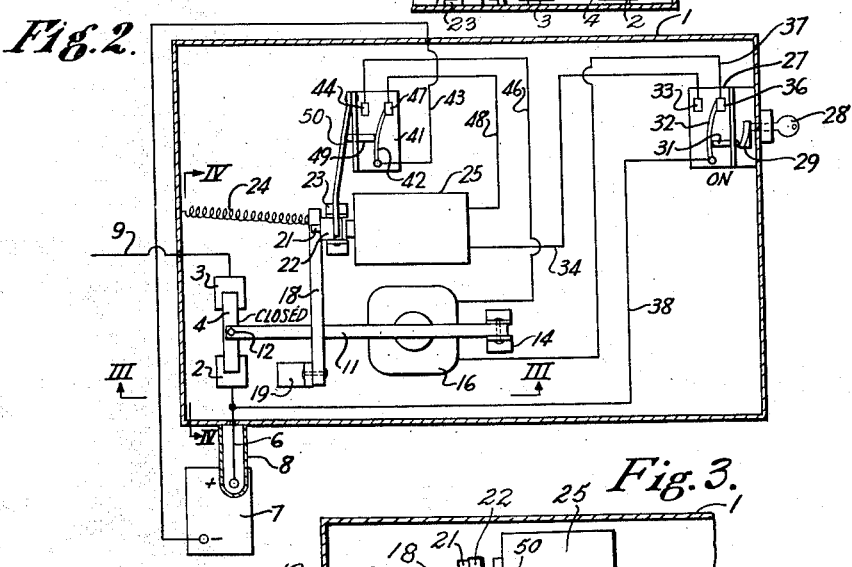
Figure 3:
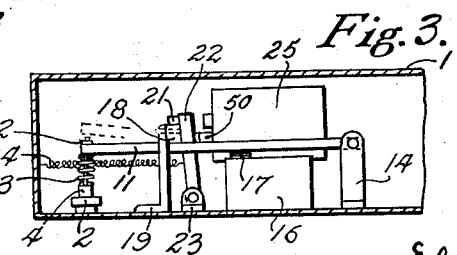

The preferred embodiment of the invention is illustrated in the accompanying drawings in which Fig. 1 is a horizontal section of the housing of my anti-theft apparatus, showing therein the various parts of the apparatus, including the electric circuits which are illustrated diagrammatically with the ignition turned off; Fig. 2 is a view like Fig. 1, but showing the positions of the movable parts of the apparatus while the ignition switch is turned on; and Figs. 3 and 4 are vertical sections taken on the lines III—III and IV—IV, respectively, of Fig. 2.

Referring to the drawings, a shallow box 1, which may be mounted in any suitable location in a motor vehicle, preferably behind the instrument panel, contains a main switch composed of spaced contact plates 2 and 3 and a bridging member 4. Contact plate 2 is connected by a wire 6 to one pole of the storage battery 7 of the vehicle. The portion of this wire between the box and the battery is enclosed in an armored cable 8. The other contact plate is connected by a wire 9 to the ignition system of the vehicle which includes the starter, spark plugs and lights. The bridging member of the main switch is connected to one end of a bar 11 by a bolt 12 slidably mounted in the bar and encircled by a coil spring 13 compressed between the bar and the member so as to assure good contact with both contact plates when the switch is closed. The other end of the bar is pivoted on a horizontal axis in a bracket 14 mounted on the bottom of the box. Beneath the bar there is an electromagnet 16 between which and the bar a coil spring 17 is compressed which presses the bar upwardly to normally hold the bridging member away from the contact plates so that the main switch will be open. When this magnet is energized it pulls the bar downwardly against the resistance of coil spring 17 to press the bridging member against the contact plates, thereby closing the main switch.

The switch is locked in closed position by a hold-down arm 18 which extends across the pivoted bar. One end of this arm is pivotally connected on a horizontal axis to a bracket 19 mounted on the bottom of the box. This arm moves up and down with the bar, but when the arm swings down when the main switch closes, the arm is held in that position by a lug 21 on the free upper end of an armature bar 22. The lower end of the armature is pivotally mounted on a horizontal axis in a bracket 23 mounted on the bottom of the box. As long as the lug overlies the arm, the arm can not rise and therefore the main switch can not open. The armature is urged toward this switch-locking position by means of a suitable spring, such as a stretched coil spring 24 connected to one side of the armature and to a side wall of the box. When the ignition is turned off, lug 21 is withdrawn from the pivoted arm so that the latter can rise and permit the main switch to open. This withdrawal of the armature from operative position is accomplished by means of an electromagnet 25, which, when energized attracts the free end of the armature away from the arm. When arm 18 rises in front of lug 21, it prevents spring 24 from swinging the armature back into operative position until the arm again swings down with the bar 11 that supports it.

The operator controls the circuits through the two electromagnets by an ignition switch 27 which is operated in the usual manner by inserting a key 28 in a lock on the instrument panel of the vehicle. When the lock is turned by the key it rotates a small cam 29 engaging the outer end of a short pin 31 slidably mounted in the switch. The inner end of this pin engages the central portion of a spring metal contact arm 32. This arm is anchored at one end and is provided with a permanent set which causes it to curve lengthwise in one direction. If the convex side of the arm is pressed, its free end will move in the opposite direction so that the arm will curve in the direction opposite to its original curvature. When the pressure at the center of the arm is released, the arm will snap back to its original position. This type of contact arm sometime is referred to as the over-center type. With the ignition key turned off, the center of the contact arm bows toward the front of the box and has its free end in engagement with an electric contact 33 connected by a wire 34 to the second electromagnet 25. The other contact 36 of this switch is connected by a wire 37 to the first magnet 16. The anchored end of the contact arm itself is connected by a wire 38 to the wire 6 that connects the battery to the main switch. Thus, when the ignition is off, the circuit through electromagnet 16 is broken at the ignition switch, but when the ignition is turned on, that circuit is closed by contact arm 32 engaging contact 36. The circuit through the ignition switch to the second magnet is closed only when the ignition is off with the contact arm engaging contact 33.

It is a feature of this invention that this antitheft apparatus uses very little current from the battery because at no time is either magnet energized for more than the moment required to open or close the main switch. This desirable result is accomplished by placing in the circuits between the electromagnets and ground a switch 41, which automatically breaks whichever circuit happens to be closed, as soon as that circuit has served its purpose of either opening or closing the main switch. At the same time the automatic switch places the other circuit, which still is open at the ignition switch, in condition to be closed by the ignition switch when the latter is turned from its present position to its other position. The automatic switch may be of the same construction as the ignition switch with a bent spring contact arm 42 connected by a wire 43 to ground or the negative pole of the storage battery. One contact member 44 of the automatic switch is connected by a wire 46 to the first electromagnet 16, while the other contact member 47 is connected by a wire 48 to the second magnet 25. The normal position of the contact arm; that is, the one it occupies when the ignition is off, is with its free end engaging the contact member 44. In this position the automatic switch connects the first electromagnet with the storage battery, but the circuit through that magnet is broken at the ignition switch. The contact arm is held against contact 44 by the inner end of a sliding pin 49 which is pressed against the bowed central portion of the arm. The outer end of the pin engages a leaf spring 50 one end of which is secured to the automatic switch. The free end of this spring engages one side of armature 22 so that when the armature is drawn to the right it causes the spring to push pin 49 to the right. When the armature swings to the left into locking position, spring 50 moves with it and thereby permits contact arm 42 to snap back to its "set" position with its free end engaging contact 47 to close the circuit between the second magnet and the battery.

The operation of this apparatus now will be described. In Fig. 1 it is shown with the various parts in the positions they occupy while the ignition is off. At such times the main switch is open and elevated hold-down bar 18 blocks movement of armature 22 to the left. Pin 49 therefore presses against the center of contact arm 42 of automatic switch 41 and causes the free end of the arm to engage contact 44, thereby connecting the first electromagnet 16 to the negative pole of the storage battery 7. No current flows through this circuit, however, because it is broken at ignition switch 27 where contact arm 32 engages contact 33 and thereby connects the positive pole of the battery to the second electromagnet 25. No current flows through the second magnet because the circuit through it is broken at the automatic switch. Therefore, both magnet circuits are open.

With the main switch open, the storage battery is isolated from the ignition system so that the vehicle in which this apparatus is installed can not be stolen. The main switch can not be closed by hand or by a jumper because the switch and its operating elements are enclosed in a tamper proof box and conduit. It is understood, of course, that whenever the operator leaves the behicle he removes key 28 from the ignition lock and takes it with him.

When it is desired to start the vehicle, the operator places key 28 back in the ignition lock and turns it, causing cam 29 to press pin 31 against the center of contact arm 32, the free end of which is thereby snapped over against contact 36 connected to the first magnet 16. This completes an electric circuit from the positive pole of the storage battery through wires 6, 38, the ignition switch, wire 37, magnet 16, wire 46, the automatic switch, and wire 43 connected to the negative pole of the storage battery. This circuit energizes magnet 16 which immediately draws bar 11 down and causes bridging member 4 to close the main switch, thereby connecting the battery with wire 9 leading to the ignition system of the vehicle so that the vehicle can be operated. As ho'd-down arm 18 falls with bar 11, armature 22 is pulled to the left by spring 24 so that lug 21 will overlie the arm and prevent it from rising thus locking the main switch closed. This movement of the armature, which occurs only a moment after magnet 16 is energized. releases the pressure of pin 49 against the center of contact arm 42 of the automatic switch, whereupon the arm snaps over into its other position against contact 47 connected to magnet 25. Consequently, the automatic switch breaks the circuit through magnet 16 a moment after that magnet has closed the main switch. The positions of the various elements at this time are shown in Fig. 2 where it will be seen that the circuit through magnet 25 is open at the ignition switch.

When key 28 is turned back to its original position to shut off the ignition, the pressure of pin 31 against contact arm 32 is relieved, so that the arm snaps back into engagement with contact 33 connected to magnet 25. This closes the circuit through the second magnet which thereby is energized. The magnet therefore pulls the free end of armature 22 toward it and withdraws lug 21 from above hold-down arm 18. The spring 17 beneath bar 11 then lifts the bar and hold-down arm in order to open the main switch. When the armature is pulled against magnet 25, spring 50 presses pin 49 against contact arm 42 of the automatic switch and snaps the arm into engagement with contact 44 connected with the first magnet. This shifting of the switch also opens the circuit through the second magnet so that the automatic switch and the ignition switch again appear as shown in Fig. 1. Opening of the circuit through magnet 25 releases armature 22, but the latter cannot move back into a position where it will hold arm 18 in main switch locking position because lug 21 strikes against the side of the arm.

It therefore will be seen that a moment after either magnet is energized, the circuit through it is broken by the automatic switch being shifted from one position to the other by the movements of armature 22 which are directly related to the opening and closing of the main switch.

According to the provisions of the patent statutes, I have explained the principle, construction and mode of operation of the invention and have illustrated and described what now is considered to be the best embodiment of the invention. However, it is understood that, within the scope of the appended claim, the invention may be practiced by other forms than those specifically illustrated and described.

I claim:

An anti-theft device for vehicles comprising apparatus for opening the circuit between a storage battery and the ignition system of the vehicle, and a tamper-proof box containing and isolating said apparatus, said apparatus comprising a main switch in the battery circuit, a bar pivotally mounted in said box for closing and opening said switch, a spring connected to said bar for urging it toward switch opening position, an electromagnet for attracting said bar toward switch closing position, an arm pivotally mounted at one end in the box and extending across said bar, an armature pivotally mounted in the box, means urging one end of the armature into contact with the free end of said arm after the switch is closed to lock the arm in switch-closing position, a second electromagnet to move the armature away from the arm to permit said spring to move the bar to switch-opening position, an automatic switch having a movable contact arm adapted to be electrically connected to one pole of the battery and engageable alternately with a pair of fixed contacts each electrically connected to a different one of said magnets, a pin engaging said last-mentioned arm and actuated by the movements of said armature for shifting the contact arm of the automatic switch from one fixed contact to the other, the movement of said armature to arm-locking position when the first magnet is energized causing said pin to shift the automatic switch arm to open the circuit through the first magnet, and the movement of the armature in the opposite direction when the second magnet is energized causing said pin to shift the automatic switch arm to open the circuit through the second magnet, whereby neither magnet remains energized for more than a moment.

ELMER J. MEAD.

REFERENCES CITED

The following references are of record in the file of this patent:

UNITED STATES PATENTS

| Number | Name | Date |
| --- | --- | --- |
| 1,056,671 | Heintz | Mar. 18, 1913 |
| 1,476,013 | Holtz | Dec. 4, 1923 |
| 1,498,818 | Smith | June 24, 1924 |
| 1,660,674 | Hemingway | Feb. 28, 1928 |
| 1,731,580 | Knaak | Oct. 15, 1929 |
| 1,902,490 | Crago | Mar. 21, 1933 |
| 2,255,905 | Somers | Sept. 16, 1941 |
| 2,260,680 | Nelsen | Oct. 28, 1941 |
| 2,425,190 | Johnson et al. | Aug. 5, 1947 |